United States Patent [19]

Knecht

[11] Patent Number: 4,565,096
[45] Date of Patent: Jan. 21, 1986

[54] PRESSURE TRANSDUCER

[75] Inventor: Thomas A. Knecht, Minnetonka, Minn.

[73] Assignee: Rosemount Inc., Eden Prairie, Minn.

[21] Appl. No.: 559,897

[22] Filed: Dec. 9, 1983

[51] Int. Cl.$^4$ ................................................ G01L 9/12
[52] U.S. Cl. ....................................... 73/718; 361/283
[58] Field of Search ................. 73/718, 720, 721, 716, 73/717, 719, 722; 338/4; 361/283

[56] References Cited

U.S. PATENT DOCUMENTS

| | | | |
|---|---|---|---|
| 3,618,390 | 11/1971 | Frick | 73/398 |
| 4,207,604 | 6/1980 | Bell | 361/283 |
| 4,222,277 | 9/1980 | Kurtz et al. | 73/721 |
| 4,257,274 | 3/1981 | Shimada et al. | 73/718 |
| 4,326,423 | 4/1982 | Hartemann | 73/721 |
| 4,398,194 | 8/1983 | Johnston | 340/870.37 |

FOREIGN PATENT DOCUMENTS 0111348 10/1983 European Pat. Off. .

OTHER PUBLICATIONS

Behr, M. and J. Giachino, "A Miniature Pressure Sensor for Automotive Applications," I Mech E. Conference Pub. 1981-10 (1981), Presented at The Third International Conference on Automotive Electronics at London in Oct. 1981.
Drawing "CPT-II" (FIG. 6.3) Acknowledged as Prior Art.

Primary Examiner—Donald O. Woodiel
Attorney, Agent, or Firm—Kinney & Lange

[57] ABSTRACT

A transducer has a first and second sensing diaphragm configured such that a first pressure P1 is applied to the first diaphragm and a second pressure P2 is applied to the second diaphragm and wherein both diaphragms are formed on the same substantially flat face of a diaphragm wafer. The transducer is configured such that each diaphragm responsive to P1 or P2 respectively also affects a fluid in a closed common fluid cavity such that the deflection of the diaphragm is representative of the pressure differential (P1−P2).

10 Claims, 2 Drawing Figures

PRESSURE TRANSDUCER

BACKGROUND OF THE INVENTION

The invention relates to pressure transducers and particularly to transducers which measure a difference in pressure between a first pressure P1 and a second pressure P2, that is P1−P2. The transducer can easily be adapted to measure absolute or gage pressure also.

Many useful differential pressure transducers are known, such as U.S. Pat. No. 3,618,390, U.S. Pat. No. 4,398,194 and others. Most differential pressure transducers which use diaphragms use a design where the two pressures are applied in the same plane but in opposite directions to affect a common diaphragm or two diaphragms. Many such designs use a common fill fluid such that diaphragm deflection is a function of differential pressure.

SUMMARY OF THE INVENTION

The invention provides a transducer for sensing differential pressure absolute or gage pressure. The transducer is made from materials such as quartz, silicon and glass and is readily manufactured using conventional batch fabrication techniques. The transducer has two sensing diaphragms. When configured to sense differential pressure, the first diaphragm opens to a first pressure (P1) and a second diaphragm opens to a second pressure (P2). Both diaphragms are formed on one substantially flat surface of a diaphragm wafer. The diaphragms are configured such that each diaphragm responsive to the pressure applied thereto, P1 or P2, respectively, also affects a fluid in an enclosed common fluid cavity such that deflection of each of the diaphragms is representative of the pressure differential (P1−P2).

Because of the construction of the transducer and the materials from which the sensor can be manufactured, deflection of the diaphragms can be measured in a conventional manner using a variety of sensing means as desired. Further since the construction can be micro miniature, the diaphragms have a low mass and a very minute amount of fluid in the enclosed fluid cavity, hence, the transducer has a fast response time to rapidly changing or pulsating differential pressure (P1−P2). This is beneficial for use with a vortex shedding flowmeter where the frequency of the changes of differential pressure are a function of the flow rate. It is also beneficial for measuring abrupt changes in differential pressure.

DESCRIPTION OF THE PREFERRED EMBODIMENTS

A pressure transducer is shown generally at 10. It is to be understood that all transducer components preferably are formed from silicon, quartz or glass and, as such, they can be easily batch fabricated using known methods on sheets of such material. Following such batch fabrication, the components can be diced and individually processed, but preferably the entire batch can be fully assembled to make complete transducers as hereinafter described and then diced to provide individual transducers as desired.

Transducer 10 has a diaphragm wafer 20 which preferably is a flat rectangular shaped wafer. Other geometric shapes can be used in accord with the invention, provided that at least one side of the wafer is substantially flat. Wafer 20 is formed from silicon, but other materials such as sapphire or quartz can also be used.

Figure 1:
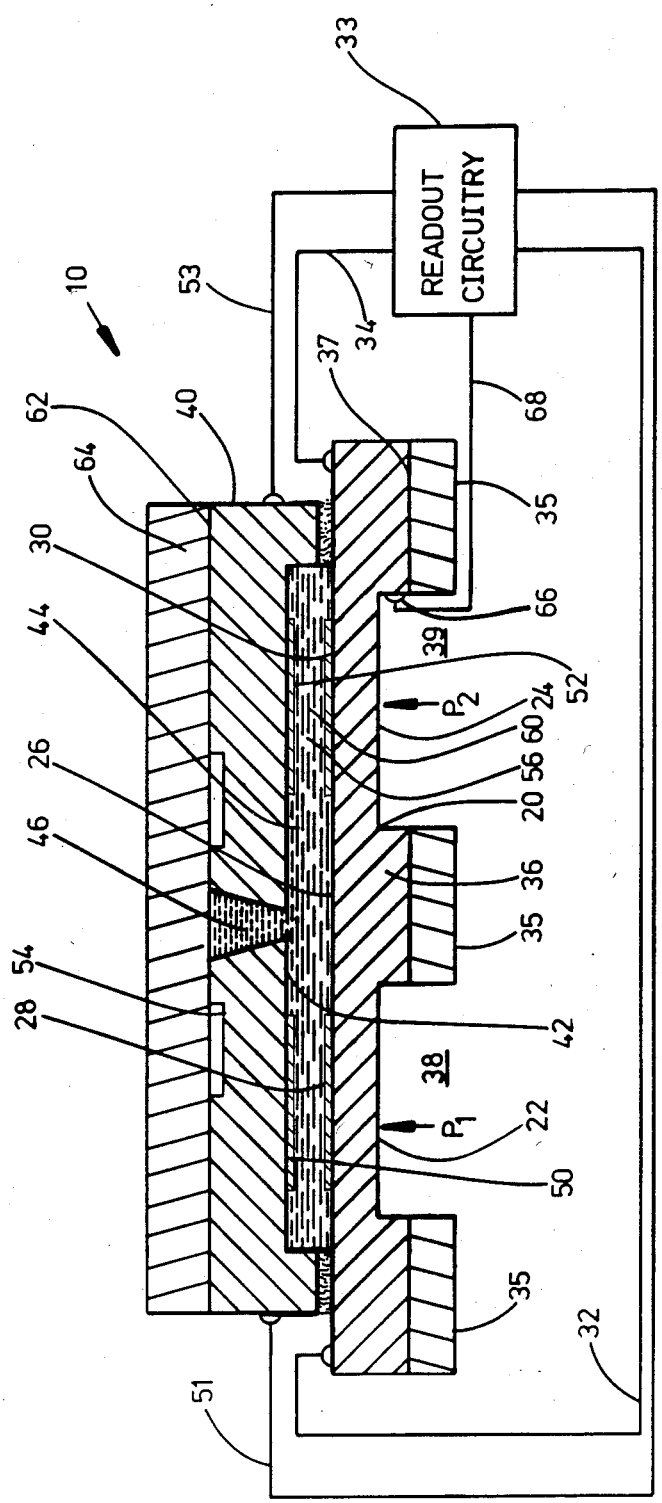
FIG. 1 is a side elevation, sectional view of a transducer in accord with the invention showing a capacitive sensing means and showing an electrical circuit in block diagram form.

In the embodiment of FIG. 1 both sides of wafer 20 initially were substantially flat. By processing, as by anisotropically etching one side of the wafer, two relatively thin sections have been formed in wafer 20, these sections are used as a first diaphram 22 and a second diaphragm 24. A first face 26 in wafer 20 is substantially flat and such face forms one side of each of the diaphragms 22, 24. When capacitance is used for sensing diaphragm deflection, a thin, electrically conductive layer 28, 30 is deposited as by sputtering, vapor deposition or diffusion on face 26 of wafer 20, as desired, so that the sensed capacitance is representative of the deflection of diaphragms 22, 24 respectively. Such conductive layers 28, 30 preferably are on the order of a few microns or less in thickness. In order to ensure that face 26 is substantially flat after such layers 28, 30 are deposited, such face 26 may be etched or machined such that when the respective layers 28, 30 of conductor material are disposed thereon, face 26 is then substantially flat. Since the conductive layer is very thin forming a recess as by etching or machining is not necessary under most conditions of operation. Circuit paths can be etched in wafer 20 from layers 28, 30 to the periphery of wafer 20 for connection to suitable leadwires 32, 34, respectively. Leadwires 32, 34 carry the sensor signals to readout circuitry 33. Such paths can then have an electrically conductive material deposited in the etched paths for coupling the layers 28, 30 to leadwires 32, 34, respectively. A suitable, nonconductive material can then be deposited on the conductive material as desired. The methods for etching, deposition and connection of the layers 28, 30 the circuit paths and the leadwires 32, 34 are well known. In the embodiment of FIG. 1 layers 28, 30 are merely extended outwardly to intersect directly with leadwires 32, 34 for connection thereto.

A massive central portion 36 is also shown on wafer 20. Portion 36 serves to substantially isolate the mechanical stresses of first diaphragm 22 from second diaphragm 24, and to substantially isolate the mechanical stresses of second diaphragm 24 from first diaphragm 22.

A backing wafer 35 formed from silicon, glass or other suitable material, preferably is formed to be conformal to the surface 37 on the side of diaphragm wafer 20 opposite from the first face 26 thereof. Backing wafer 35 is provided with two etched or drilled through pressure ports 38, 39 for facilitating a first pressure P1 and a second pressure P2 to diaphragms 22, 24, respectively. Backing wafer 35 preferably is somewhat massive to further assist in isolating the mechanical stresses of the diaphragms 22, 24 with respect to each other and to isolate mechanical stress from the ultimate housing where transducer 10 is disposed for operation. Backing wafer 35 is bonded to diaphragm wafer 20 by sputtered pyrex bond, anodic bond, glass frit, metal diffusion or other known method, as desired.

An overpressure stop wafer 40 which, prior to processing, has a generally substantially symmetric geometry with diaphragm wafer 20, is etched, as anisotropically, on first stop face 42 to a very slight depth (in the order of a few ten thousandths of an inch or less) thus forming a recess 44. Diaphragms 22, 24 preferably are in the order of 1 to 10 thousandths of an inch in thickness, thus in such embodiment, there preferably is approximately at least an order of magnitude of difference between the depth of the recess 44 and the thickness of diaphragms 22, 24. Preferably the etched surface is substantially flat. Overpressure stop wafer 40 also has a central bore 46 which preferably is formed by etching or drilling through wafer 40. Central bore 46 is oriented such that it is in the central portion of wafer 40 and preferably such that diaphragms 22, 24 will not rest on central bore 46 when the diaphragms 22, 24 are subjected to an overpressure condition after overpressure stop wafer 40 is affixed to diaphragm wafer 20. Two thin, electrically conductive layers 50, 52 are deposited in recess 44 in a hereinbefore described manner. Stop layers 50, 52 are coupled to leadwires 51, 53 respectively in a desired manner, as in a hereinbefore described manner for leadwires 32, 34 to layers 28, 30, such that stop layers 50, 52 cooperate with layers 28 and 30, respectively to form a first variable capacitor (C1), associated with first diaphragm 24, and a second capacitor (C2), associated with second diaphragm 24. Leadwires 51, 53 carry the signals thereon to readout circuitry 33. Readout circuitry 33 can be known circuitry providing a signal representative of the sensed differential pressure P1−P2 gage pressure or absolute pressure, when transducer 10 is so configured. It is to be understood that the requirement for a recess 44 can be eliminated by building up the peripheral area of diaphragm wafer 20 or overpressure stop wafer 40 where they are joined. Such buildup can be in the form of the bonding material or a very thin deposition of material about such periphery or other convenient means. As desired, an annular recess 54 about central bore 46 can be etched in overpressure stop wafer 40.

Diaphragm wafer 20 and overpressure stop wafer 40 are joined together by anodic bonding, eutectic bonding or glass frit bonding. When diaphragm wafer 20 and overpressure stop wafer 40 are joined together, a cavity 56 is formed by first face 26 of the diaphragm wafer 20 and recess 44 of overpressure stop wafer 40. The cavity 56 has an opening through central bore 46. Cavity 56 is very small, for example, only 2 ten thousandths of an inch (0.0002) in thickness. The thickness of cavity 56 has necessarily been exaggerated on the drawing for illustration purposes. A fluid 60 such as a substantially noncompressible liquid is then inserted through central bore 46 to substantially fill cavity 56. Fluid 60 is selected to have a suitable dielectric constant when capacitance sensing is used. It is to be understood that the volume of fluid 60 in central bore 46 and cavity 56 is very small, as the total volume thereof in one preferred embodiment is about $2 \times 10^{-5}$ inches cubed. Standard techniques of evacuation followed by backfilling are employed to ensure homogeneity of fluid 60.

Another suitable filling method, not shown, is to dispose a capillary tube into central bore 46 and to progressively pinch it off until the desired fluid fill is attained in cavity 56. When this method is used, the fluid can be pressurized such that diaphragms 22, 24 are deflected away from overpressure stop wafer 40. Such pressurization of cavity 56 may be used as desired. When the capillary tube is used, cavity 56 and central bore 46 can be sealed thereby and further sealing means is not required. Filling could also be implemented by any of known methods and a wedged plug could then be inserted in central bore 46. The plug could then be conventionally bonded to central bore 46. As desired, the plug could be swaged into central bore 46 to establish a desired pressure in fluid 60.

Annular recess 54 collects small amounts of surplus fluid 60 and prevents same from spreading over the entire upper surface 62 of the overpressure stop wafer 40 or to adjacent overpressure stop wafers when a batch processing method of manufacture is used. Annular recess 54 also collects surplus fluid 60 when cover plate 64 is bonded to the overpressure stop wafer 40 to seal fluid 60 in cavity 56 and central bore 46. Such surface fluid may be from the meniscus formed by fluid 60 in central bore 46.

Cover plate 64 is yet a fourth wafer formed from glass, silicon or other suitable material. Cover plate 64 is conventionally bonded to overpressure stop wafer 40. Fluid 60 may be sensitive to high temperatures, hence, the bonding of cover plate 64 to overpressure stop wafer 40 should be accomplished below any such temperature. It has been found that when silicone is used as fluid 60 that bonding should be done at less than 300 degrees centigrade. Bonding can be organic or nonorganic and all such bonding is well known. Glycerine or a suitable mixture of glycerine and water can be used for fluid 60 when the selected sensing means does not require a fluid with a high dielectric constant. Glycerine or the mixture of glycerine and water provides a low thermal coefficient of expansion, which is closer to the coefficient of expansion of the materials of transducer 10.

A temperature sensor 66 can be disposed in transducer 10 on the, for example, diaphragm wafer 20. Leadwires 68 carry the temperature sensor signal to the readout circuitry 33. The temperature data therefrom is used to compensate, in the known readout circuitry 33, for repeatable measurement errors caused by widely varying temperatures, such as fluid expansion characteristics, changes of the dielectric constant of the fluid fill when the sensing means is a capacitor, modulus of elasticity changes and dimension changes. This correction results in a very accurate readout which is attained in part because of the high elastic characteristics and mechanical stability of the transducer components.

In operation, the first pressure P1 is applied on the first diaphragm 22 urging diaphragm 22 to deflect towards the overpressure stop wafer 40; and, the second pressure P2 is applied on the second diaphragm 24, also urging diaphragm 24 to deflect towards the overpressure stop wafer 40. Both diaphragms 22, 24 are fluidically coupled on their overpressure stop wafer 40 side by fluid 60 in cavity 56. The resultant deflection of the diaphragms 22, 24 is thus proportional to the pressure differential (P1−P2). When capacitance sensing is used, as in the preferred embodiment of FIG. 1, layer 28 and stop layer 50 each provide one capacitor plate of a first capacitor C1, and layer 30 and stop layer 52 each provide one capacitor plate of a second capacitor C2. It is to be understood that stop layer 51 and stop layer 53 can be a common electrically conductive layer. Such common layer could then form a common capacitor plate for capacitors C1 and C2. Since layers 28, 30 are disposed on diaphragms 22, 24, respectively, deflection of the diaphragms 22, 24 is measured by the capacitances C1 and C2, respectively. Hence, the capacitance of capacitors C1 and C2 is a function of the differential pressure (P1−P2). It is to be understood that since C1 and C2 are each representative of the differential pressure that for differential pressure measurement only C1 or C2 must be active, and alternatively, that only layer 28 and stop layer 50 or layer 30 and stop layer 52 need be deposited for the transducer to provide a capacitance signal representative of differential pressure.

The measured capacitance of C1 and C2 are fed through the leadwires 32, 34 and 51, 52 to suitable known readout circuitry 33. Such circuitry responsive to the measured capacitances C1 and C2 then provides a signal representative of the pressure difference (P1−P2).

Figure 2:
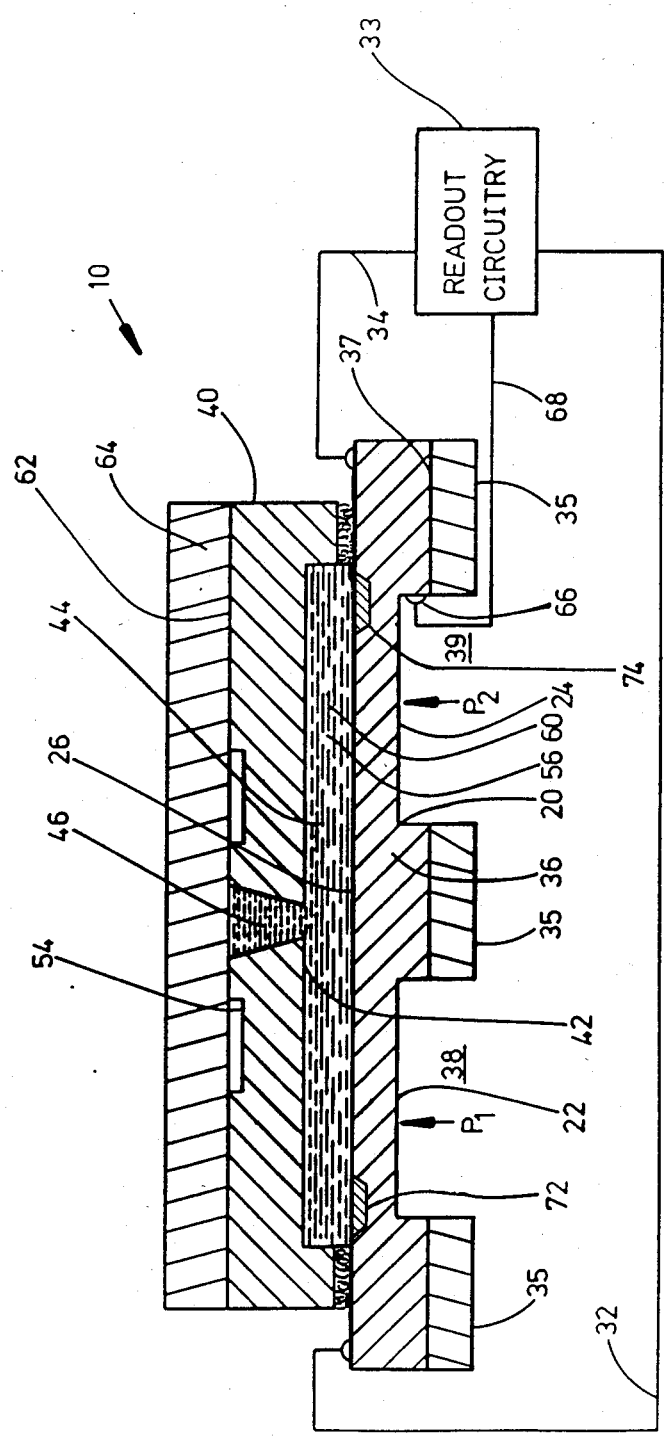
FIG. 2 is a side elevation, sectional view of a transducer in accord with the invention showing a sensing means such as a resistance bridge, a resistance, a piezoelectric sensor, or a piezoresistance sensor and showing an electrical circuit.

While the foregoing description of the preferred embodiments have considered capacitive sensing techniques other known sensing techniques can be used. The sensing methods as shown in FIG. 2 include, for example, a full resistance bridge, a half resistance bridge or a single resistor coupled to at least one diaphragm 22 or 24, inductive sensors coupled to at least one diaphragm 22, or 24, piezoelectric or piezoresistive sensors coupled to at least one of the diaphragm 22 or 24. Such sensors 72, 74 may be disposed in or on diaphragm 22, 24 by vapor deposition, diffusion, or other known methods. Optical sensing or other sensing means can also be used as desired.

The transducer has many advantages which include by means of example, a low cost of manufacture as they are fully adaptable to batch processing. The diaphragms 22, 24 are easily manufactured as they have a common substantially flat surface, flat face 26. The common overpressure stop, also a substantially flat surface, which because of the only slight deflection of diaphragms 22, 24 provides for diaphragm 22, 24 overpressure protection without the difficult contours of a further deflected diaphragm, such as a convex shaped overprotection stop. Such contoured shapes are difficult, and, hence, more expensive to manufacture. The preferred embodiment does not however preclude such contoured shapes in overpressure stop wafer 40 if such contours are desired.

There is a very very small volume of fluid 60 in cavity 56 and central bore 46 in the overpressure stop wafer 40. Consequently, even though the thermal expansion coefficient of fluid 60 is different from the other materials which are used to make transducer 10, transducer 10 is accurate over a broad range of temperatures. Also, since the volume of fluid 60 is very low, the potential for rupture of the diaphragms 22, 24 is low, even at elevated temperatures.

The transducer described herein can withstand extreme overpressures from either P1 or P2 or both P1 and P2. Overpressure protection from one of P1 and P2 is achieved through support of its respective diaphragms 22, 24 against a substantially flat overpressure stop and overpressure applied simultaneously from both P1 and P2 is provided through the fluid coupling. In either case, the deflection of diaphragms 22, 24 is restricted to the transducer design range.

It is to be understood that pressure port 38 or 39 may be evacuated and sealed or pressurized and sealed in a known manner. Hence, the transducer is easily configured for absolute or gage pressure.

What is claimed is:

1. A transducer having a first sensing diaphragm and a second sensing diaphram each configured such that a first pressure (P1) is applied to the first diaphragm and a second pressure (P2) is applied to the second diaphragm, and wherein both diaphragms are formed on a diaphragm wafer and means defining an enclosed common fluid cavity fluidly open to each diaphragm responsive to such pressure, said cavity being filled with a substantially non-compressible fluid such that deflection of the diaphragms is representative of the pressure differential (P1−P2), the first and second diaphragms being formed on the one substantially flat face of the diaphragm wafer.

2. A transducer according to claim 1 further comprising sensing means coupled to at least one of the diaphragms for measuring the differential pressure P1−P2.

3. A transducer in accord with claim 2 wherein said fluid comprises a fluid with a low thermal coefficient of expansion.

4. A transducer in accord with claim 2 wherein the sensing means comprises a sensor selected from the group consisting of resistance bridge, a resistance, a piezoelectric sensor, or a piezoresistance sensor.

5. A transducer in accord with claim 1 wherein the diaphragm wafer is formed from a material which is selected from a group consisting of silcon, quartz or sapphire.

6. A transducer having a first sensing diaphragm and a second sensing diaphragm each configured such that a first pressure (P1) is applied to the first diaphragm and a second pressure (P2) is applied to the second diaphragm, and wherein both diaphragms are formed on a diaphragm wafer and wherein each diaphragm responsive to such pressure respectively also affects a fluid in an enclosed common fluid cavity such that deflection of the diaphragms is representative of the pressure differential (P1−P2), the first and the second diaphragms being formed on one substantially flat face of the diaphragm wafer sensing means coupled to at least one of the diaphragms for measuring the differential pressure (P1−P2), and an overpressure stop wafer means disposed on and bonded to the diaphragm wafer and for cooperating with the diaphragm wafer to form the common fluid cavity, and having support means for providing an overpressure stop for each of the diaphragms.

7. A transducer according to claim 6 wherein the support means is a recess defined in the overpressure stop wafer having a substantially flat surface thereon for providing an overpressure stop for said diaphragms.

8. A transducer according to claim 7 wherein the sensing means further comprises a layer of electrically conductive material disposed on at least one of the diaphragms, and at least one layer of electrically conductive material disposed on the overpressure stop wafer proximate to such diaphragm for providing at least one capacitor responsive to deflection of said diaphragm.

9. A transducer according to claim 8 wherein said fluid comprises a noncompressible liquid having a high dielectric constant.

10. A transducer having a first sensing diaphragm and a second sensing diaphragm each configured such that a first pressure (P1) is applied to the first diaphragm and a second pressure (P2) is applied to the second diaphragm, and wherein both diaphragms are formed on a diaphragm wafer and wherein each diaphragm responsive to such pressure respectively also affects a fluid in an enclosed common fluid cavity filled with a substantially non-compressive fluid such that deflection of the diaphragms is representative of the pressure differential (P1−P2), the diaphragm wafer having one substantially flat face, and separated recess means defined in the opposite face of the diaphragm wafer means from the one flate face to form separate reduced thickness locations defining the first and the second diaphragms.

* * * * *